(12) United States Patent
Singalandapuram Mahadevan et al.

(10) Patent No.: US 12,435,657 B2
(45) Date of Patent: Oct. 7, 2025

(54) GAS SENSOR WITH PROTECTION TUBE FOR EXHAUST SYSTEM

(71) Applicant: FCA US LLC, Auburn Hills, MI (US)

(72) Inventors: Boopathi Singalandapuram Mahadevan, Ann Arbor, MI (US); Steven L Talley, Detroit, MI (US); Yi Zheng, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 230 days.

(21) Appl. No.: 18/065,119

(22) Filed: Dec. 13, 2022

(65) Prior Publication Data

US 2024/0191647 A1    Jun. 13, 2024

(51) Int. Cl.
| | |
|---|---|
| *F01N 11/00* | (2006.01) |
| *B01D 53/94* | (2006.01) |
| *F01N 13/00* | (2010.01) |
| *F01N 13/18* | (2010.01) |

(52) U.S. Cl.
CPC ............ *F01N 11/007* (2013.01); *B01D 53/94* (2013.01); *F01N 13/008* (2013.01); *F01N 13/1805* (2013.01)

(58) Field of Classification Search
CPC .. F01N 13/008; F01N 2260/20; G01N 1/2252
See application file for complete search history.

(56) References Cited

U.S. PATENT DOCUMENTS

| | | | |
|---|---|---|---|
| 8,800,264 B2* | 8/2014 | Sullivan | F01N 13/008 60/276 |
| 8,992,752 B2 | 3/2015 | Onkawa et al. | |
| 9,476,863 B2 | 10/2016 | Sakuma et al. | |
| 10,247,695 B2* | 4/2019 | Oya | G01N 27/41 |
| 2014/0223887 A1* | 8/2014 | Duault | G01N 1/2202 60/274 |
| 2015/0330939 A1* | 11/2015 | Tahira | G01N 27/4074 29/25.03 |
| 2015/0355067 A1* | 12/2015 | Zhang | G01N 15/0656 73/23.31 |
| 2018/0321125 A1* | 11/2018 | Holzknecht | G01N 27/4077 |

\* cited by examiner

*Primary Examiner* — Anthony Ayala Delgado
(74) *Attorney, Agent, or Firm* — Jeremy J. Klobucar

(57) ABSTRACT

An exhaust system for a vehicle having an internal combustion engine includes an exhaust pipe configured to receive an exhaust gas flow from the engine at a predetermined first velocity, and an exhaust gas sensor assembly coupled to the exhaust pipe and in fluid communication with an interior of the exhaust pipe to sense a predetermined constituent contained within the exhaust gas flow. The exhaust gas sensor assembly includes a sensing element disposed at least partially within a protection tube assembly having a plurality of apertures configured to receive a sensor flow (SF) portion of the exhaust gas flow. The plurality of apertures has a combined total flow area that provides a surface averaged total velocity at the sensing element to be greater than or equal to 70% of the first velocity to thereby increase a dynamic response of the exhaust gas sensor assembly.

19 Claims, 4 Drawing Sheets

GAS SENSOR WITH PROTECTION TUBE FOR EXHAUST SYSTEM

FIELD

The present application relates generally to internal combustion engine exhaust systems and, more particularly, to exhaust system gas sensor protection tubes to improve dynamic response.

BACKGROUND

Internal combustion engine exhaust systems typically include a gas sensor for detecting a particular constituent of the exhaust gas such as, for example, oxygen. Conventional gas sensors typically include a protection tube configured to protect a sensor element contained therein. However, such conventional protection tubes often lack the ability to capture the fast dynamic change in oxygen concentration in the exhaust. Such slow or lagging sensors may not detect aging or damaged catalysts and thus not efficiently monitor performance of upstream components to maintain efficient emissions control. Thus, while such systems do work for their intended purpose, it is desirable to provide continuous improvement in the relevant art.

SUMMARY

According to one example aspect of the invention, an exhaust system for a vehicle having an internal combustion engine is provided. In one exemplary implementation, the exhaust system includes an exhaust pipe configured to receive an exhaust gas flow from the engine at a predetermined first velocity, and an exhaust gas sensor assembly coupled to the exhaust pipe and in fluid communication with an interior of the exhaust pipe to sense a predetermined constituent contained within the exhaust gas flow. The exhaust gas sensor assembly includes a sensing element disposed at least partially within a protection tube assembly having a plurality of apertures configured to receive a sensor flow (SF) portion of the exhaust gas flow. The plurality of apertures has a combined total flow area that provides a surface averaged total velocity at the sensing element to be greater than or equal to 70% of the first velocity to thereby increase a dynamic response of the exhaust gas sensor assembly. Through testing and development, this percentage, along with the percentages recited below, were determined to be a critical factor contributing to the improvements provided by the design of the protection tube assembly.

In addition to the foregoing, the described exhaust system may include one or more of the following features: wherein the exhaust pipe includes a central axis with a central region having a maximum flow velocity at the first velocity; wherein the sensing element is disposed outside of the central region; wherein the exhaust gas sensor is disposed adjacent an inner wall surface of the exhaust pipe; and wherein the plurality of apertures has a combined total flow area that provides a surface averaged total velocity at the sensing element to be greater than or equal to 80% of the first velocity to thereby increase a dynamic response of the exhaust gas sensor assembly.

In addition to the foregoing, the described exhaust system may include one or more of the following features: wherein the plurality of apertures has a combined total flow area that provides a surface averaged total velocity at the sensing element to be greater than or equal to 90% of the first velocity to thereby increase a dynamic response of the exhaust gas sensor assembly; and wherein the plurality of apertures have a combined total flow area that provides a surface averaged total velocity at the sensing element to be substantially equal to the first velocity to thereby increase a dynamic response of the exhaust gas sensor assembly.

In addition to the foregoing, the described exhaust system may include one or more of the following features: wherein the protection tube assembly comprises an inner protection tube at least partially receiving the sensing element therein, and an outer protection tube at least partially receiving the inner protection tube therein; wherein the inner protection tube includes a first sidewall and a first bottom wall, and the outer protection tube includes a second sidewall and a second bottom wall; and wherein the plurality of apertures are formed in the first sidewall and the second sidewall.

In addition to the foregoing, the described exhaust system may include one or more of the following features: wherein the exhaust gas sensor assembly further includes a main housing coupled to the protection tube assembly, a plug for sealing the sensing element within the main housing, and electrical leads configured to couple to electrical terminals of the sensing element; wherein the main housing is threadably coupled to the exhaust pipe such that the protection tube assembly and at least a portion of the sensing element are disposed within the exhaust pipe; a catalytic converter disposed upstream of the exhaust gas sensor assembly; and wherein the exhaust gas sensor assembly is an oxygen sensor.

According to another example aspect of the invention, a method of manufacturing an exhaust system for a vehicle having an internal combustion engine is provided. The method includes, in one exemplary implementation, providing an exhaust pipe configured to receive an exhaust gas flow from the engine at a predetermined first velocity, coupling an exhaust gas sensor assembly to the exhaust pipe to be in fluid communication with an interior of the exhaust pipe to sense a predetermined constituent contained within the exhaust gas flow, providing the exhaust gas sensor assembly with a sensing element disposed at least partially within a protection tube assembly having a plurality of apertures configured to receive a sensor flow (SF) portion of the exhaust gas flow, and providing the plurality of apertures with a combined total flow area that provides a surface averaged total velocity at the sensing element to be greater than or equal to 70% of the first velocity to thereby increase a dynamic response of the exhaust gas sensor assembly.

In addition to the foregoing, the described method may include one or more of the following features: disposing the exhaust gas sensor assembly adjacent an inner wall surface of the exhaust pipe; disposing the exhaust gas sensor assembly outside a central region of the exhaust pipe having a maximum flow velocity at the first velocity; and providing a catalytic converter upstream of the exhaust gas sensor assembly, wherein the exhaust gas sensor assembly is an oxygen sensor.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do

DETAILED DESCRIPTION

The present application is generally directed to an exhaust gas sensor with a protection tube that allows increased flow and diffusion into the sensor element equal or close to that of a flow velocity of the exhaust stream. This allows the gas sensor to achieve a higher dynamic response than known sensors, thereby improving monitoring performance efficiency of upstream components (e.g., catalysts) to maintain efficient emissions control. Unlike known gas sensors, which must be moved to a max flow region to achieve improved dynamic response, the present design allows the gas sensor to operate in customary locations close to the exhaust pipe, thereby enabling high dynamic response, for example, when packaging is limited and a sensor cannot be placed in the max flow region. As such, the protection tube design described herein drastically improves sensor dynamic response without changing its location, thereby minimizing or eliminating packaging concerns.

Figure 1:
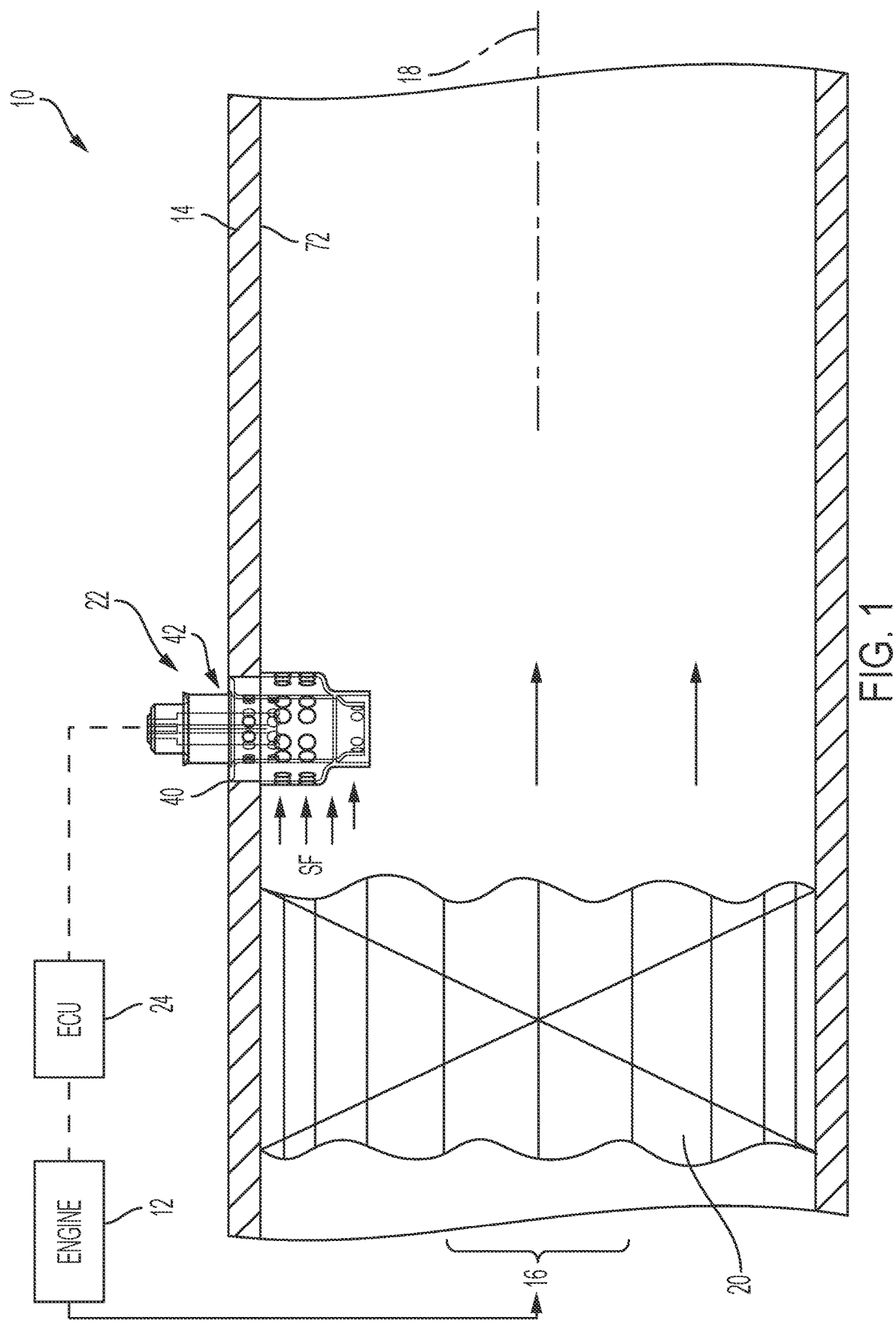
FIG. 1 is a schematic illustration of a vehicle exhaust system in accordance with the principles of the present disclosure.

With initial reference to FIG. 1, an example exhaust system for a vehicle is illustrated and generally identified at reference numeral 10. The exhaust system 10 is configured to receive and direct a flow of exhaust gas from an internal combustion engine 12 to an area outside of the vehicle. Additionally, the exhaust system 10 is configured to treat the exhaust gas to thereby reduce emissions of certain substances in the exhaust gas and help prevent their escape into the atmosphere.

In the example embodiment, the exhaust system 10 includes an exhaust pipe 14 configured to receive the exhaust gas from an exhaust manifold (not shown) in fluid communication with combustion chambers of the engine 12. The exhaust pipe 14 is hollow and cylindrical such that the exhaust gases can flow therethrough. However, it will be appreciated that exhaust pipe 14 can have any suitable shape and/or cross-sectional shape. As shown in FIG. 1, exhaust gas flows through a maximum flow central region 16 of the exhaust pipe 14 generally along a central axis 18 thereof, while regions outside of the central region 16 may have a flow velocity less than the maximum flow, particularly near the wall of the exhaust pipe 14.

In the illustrated example, the exhaust system 10 includes one or more catalytic converters 20 (only one shown) and one or more exhaust gas sensor assemblies 22 (only one shown). The catalytic converter 20 is configured to reduce or convert a desired exhaust gas constituent such as, for example, carbon monoxide (CO), hydrocarbon (HC), and/or nitrogen oxides (NOx). For example, the catalytic converter 20 can be a three-way conversion (TWC) catalyst and contains material that serves as a catalyst to reduce or oxidize the components of the exhaust gas into harmless gases.

The exhaust gas sensor assembly 22 is configured to sense a particular constituent contained within the exhaust gas flow. For example, the exhaust gas sensor assembly 22 can be an oxygen sensor configured to detect oxygen content flowing within the exhaust system 10. The gas sensor assembly 22 is configured to provide corresponding signals to an engine control unit (ECU) 24, which is configured to utilize the signals for controlling operation of the engine or for other purposes. For example, the gas sensor assembly 22 can monitor the amount of oxygen in the exhaust system to monitor the efficiency of the catalytic converter(s) 20 and confirm they are working properly, as well as provide information about the air to fuel ratio operation of the engine 12 for efficient operation thereof.

With additional reference to FIG. 2, the gas sensor assembly 22 will be described in more detail. As described above, the gas sensor assembly 22 includes a protection tube design that allows increased flow at the sensor tip, which increases the dynamic response of the sensor and leads to more efficient monitoring thereof.

In the example embodiment, the gas sensor assembly 22 generally includes a main housing 30, a sensing element 32, and a protection tube assembly 34. The main housing 30 is configured to house the sensing element 32 and generally includes a lower end 36 and an upper end 38. Although shown as a single housing, the main housing 30 can be formed by a plurality of smaller housing components to form the whole. The housing lower end 36 is configured to be at least partially inserted through an opening 40 (FIG. 1) formed in the wall of the exhaust pipe 14 for subsequent coupling thereto, for example, via a threaded attachment 42 (FIG. 1). The housing upper end 38 is open and configured to receive a plug 44 for sealing the main housing 30. Electrical leads 46 extend through the plug 44 and upper end 38 for connection with electrical terminals 48 of the sensing element 32.

In the example embodiment, the protection tube assembly 34 is coupled to the main housing lower end 36 and generally includes an inner protection tube 50 and an outer protection tube 52. The inner protection tube 50 is a generally tubular member configured to receive at least a portion of the sensing element 32 therein, and includes a bottom wall 54, a sidewall 56, and an open upper end 58, which is coupled to the main housing 30. Similarly, the outer protection tube 52 is a generally tubular member configured to receive at least a portion of the inner protection tube 50 therein, and includes a bottom wall 60, a sidewall 62, and an open upper end 64, which is coupled to the inner protection tube 50 and/or the main housing 30.

In the example embodiment, the bottom walls 54, 60 extend perpendicular to or substantially perpendicular to a longitudinal axis 66 of the gas sensor assembly 22 and, when coupled to the exhaust pipe 14, parallel to or substantially parallel to the exhaust pipe central axis 18. The sidewalls 56, 62 extend parallel to or substantially parallel to the sensor longitudinal axis 66 and, when coupled to the exhaust pipe 14, perpendicular to or substantially perpendicular to the central axis. However, various other protection tube shapes and/or orientations are envisioned. As described herein in more detail, the inner and outer protection tubes 50, 52 include a plurality of inlet/outlet apertures 70 formed in the sidewalls 56, 62 and/or the bottom walls 54, 60 configured to receive a portion of the exhaust gas flow in the exhaust pipe 14.

With continued reference to FIG. 1, in the illustrated example, the gas sensor assembly 22 extends through the opening 40 formed in the wall of the exhaust pipe 14 in a location downstream of the catalytic converter 20, toward the interior of the exhaust pipe 14. In this way, the sensing element 32 is disposed within the exhaust pipe 14 such that the apertures 70 allow fluid communication of the exhaust gas within the exhaust pipe 14 to the sensing element 32. As shown, the sensor assembly 22 is disposed adjacent an inner wall surface 72 of the exhaust pipe 14, thereby locating the sensor assembly 22 at a distance from the central region 16 and central axis 18 of the exhaust pipe 14 to avoid impeding exhaust gas flow and provide accurate readings.

The sensor assembly 22 is in signal communication with a controller, such as ECU 24. In the example embodiment, sensor assembly 22 is configured to detect the amount of oxygen within the flow of exhaust gas in the exhaust pipe 14. The sensor assembly 22 is further configured to send a corresponding signal to the ECU 24, which utilizes the signal to modify an operation of the engine 12. For example, the ECU 24 can adjust the injected fuel to air ratio depending on the feedback signal from sensor assembly 22. However, it will be appreciated that gas sensor assembly 22 may be any suitable type of sensor configured to detect other exhaust gas constituents, and gas sensor assembly 22 may located and positioned in various other locations in the exhaust pipe 14.

Figure 2:
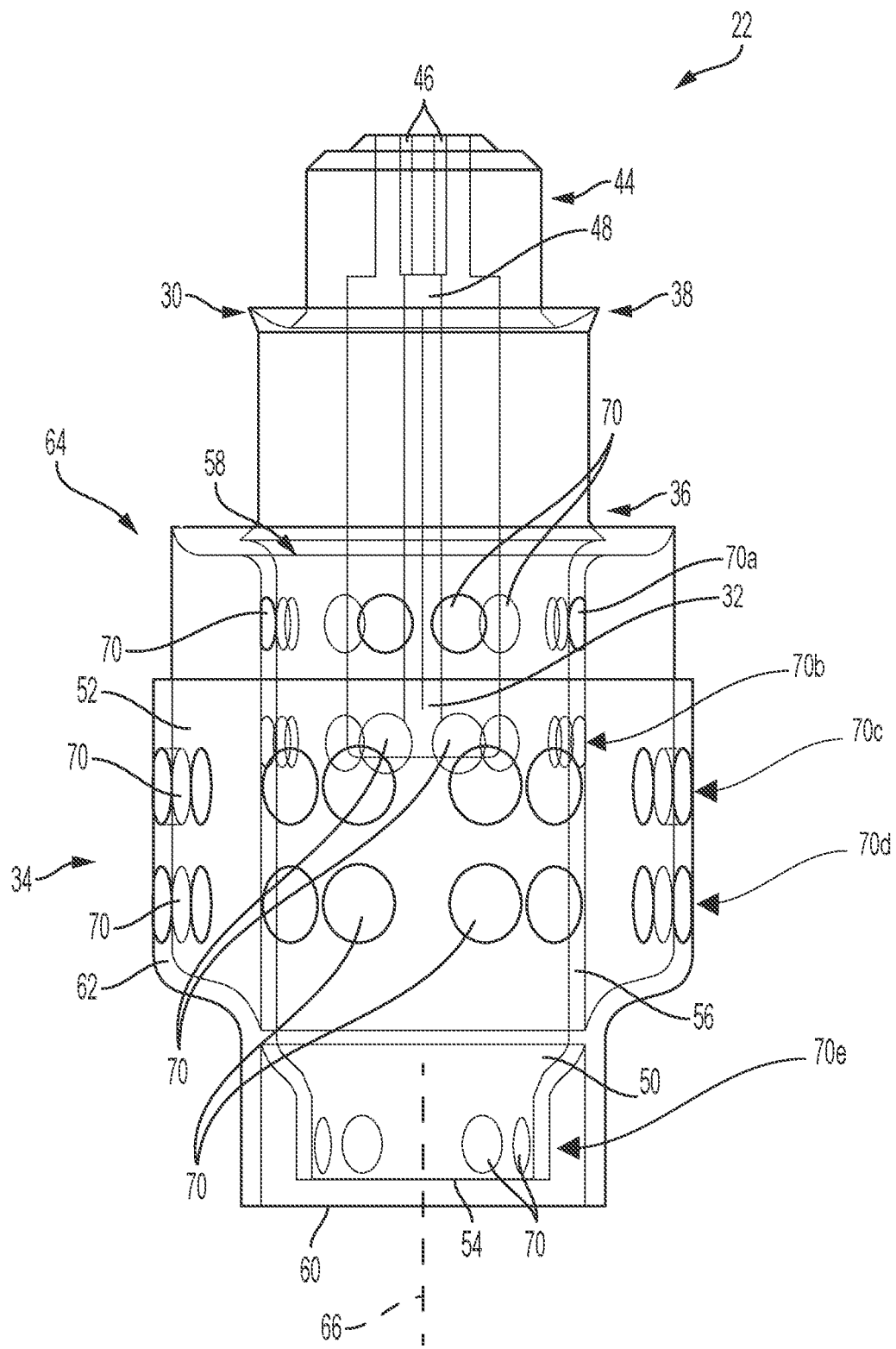
FIG. 2 is a translucent side view of an example protection tube assembly for an exhaust gas sensor assembly that may be utilized in the vehicle exhaust system shown in FIG. 1, in accordance with the principles of the present disclosure.

With continued reference to FIG. 2, as previously described, the protection tube assembly 34 includes a plurality of inlet/outlet apertures 70 to allow the exhaust gas to flow to at least a portion of the sensing element 32. Advantageously, the areas of the individual inlet/outlet apertures 70 combine to provide a total flow area that allows a "sensor flow" 'SF' into the protection tube assembly 34 at a predetermined flow velocity to improve signal dynamic response. In one example embodiment, this SF velocity can be measured as a Surface Averaged Total Velocity at the sensing element 32 by using a computational fluid dynamics (CFD) tool (e.g., software) that runs at specified mass flow rates as a function of crank angle (dynamic boundary conditions) and a selected exhaust pipe geometry. In one embodiment, the SF velocity is greater than or equal to 70% or approximately 70% of the exhaust flow velocity in the exhaust pipe 14. In another embodiment, the SF velocity is greater than or equal to 80% or approximately 80% of the exhaust flow velocity. In another embodiment, the SF velocity is greater than or equal to 90% or approximately 90% of the exhaust flow velocity. In yet another embodiment, the SF velocity is equal to or substantially equal to (e.g., within 1%) of the exhaust flow velocity. Through testing and development, the aforementioned range of percentages were determined to be a critical factor contributing to the improvements provided by the design of the protection tube assembly. In one example, shown in FIG. 2, the protection tube assembly 34 includes first and second rings of annularly aligned apertures 70a, 70b formed in the inner protection tube 50, third and fourth rings of annularly aligned apertures 70c, 70d formed in the outer protection tube 52, and a fifth ring of annularly aligned apertures 70e formed in the inner protection tube 50.

Figure 3:
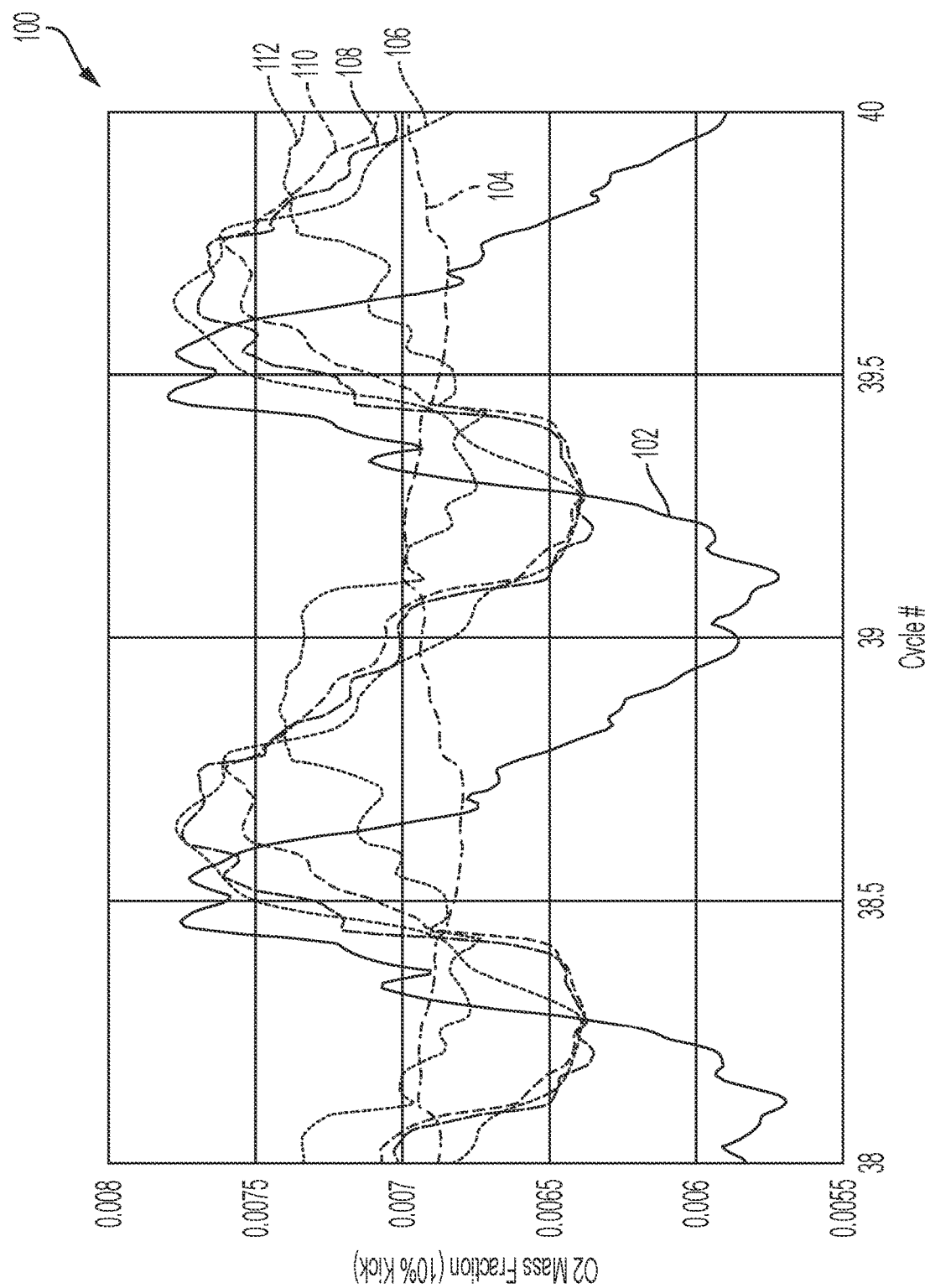
FIG. 3 is a plot of an example improved signal dynamic response of the sensor assembly shown in FIG. 1 compared to conventional sensor assemblies, in accordance with the principles of the present disclosure.

With reference now to FIG. 3, an example plot 100 illustrates the improved signal dynamic response of sensor assembly 22 as a function of engine cycle and gas (e.g., O2) mass fraction using the surface averaged velocity metrics. The peak to peak gas (e.g., O2) mass fraction at 10% kick is greater than 10% of the average O2 fraction. For example, the peak to peak O2 mass fraction simulation can be carried out on a CFD software using the inputs from a 1-D simulation model. During this simulation, engine injectors are dialed at 10% rich and 10% lean for a period of time. The engine simulation software provides resultant information such as exhaust flow, temperature, velocity, and oxygen concentration boundary conditions for each cylinder as a function of engine crank angle for multiple engine cycles. This data may be used as an input boundary condition and resultant mixing and concentration at the downstream sensor location is studied in the CFD software.

In one example, the 1-D engine model is a thermodynamic simulation model to simulate engine performance such as power, pressure, flow, velocity, emissions concentration, etc. at the engine exhaust pipe or manifold. The simulation outputs are one dimensional, e.g., along the axis of flow. The model outputs may then be used to calculate various features such as multi-dimensional flow, temperature, pressure, and concentration at the axial and radial locations of the exhaust system (exhaust pipes, catalysts, and O2 sensor mounting locations, etc.) in the CFD software. The flow and O2 concentration outputs as a function of crank angle and cycles are used in the CFD model. Alternatively, the input conditions may be also be provided from engine dyno experiments.

Because the gas sensor assembly 22 allows for a greater flow velocity near or equal to the exhaust flow velocity of the exhaust pipe 14, a sharper signal dynamic response to O2 (or other gas) fluctuations is attained. As shown, the present design of sensor assembly 22 provides for the sharp response to O2 fluctuations (shown by line 102), compared to conventional gas sensors (shown by lines 104, 106, 108, 110, 112). As such, the present design allows gas sensor assembly 22 to be located near the inner wall surface 72 of the exhaust pipe 14, unlike known gas sensors, which must be located at the exhaust pipe central axis 18 to achieve even a remotely close signal dynamic response as the present design.

Figure 4:
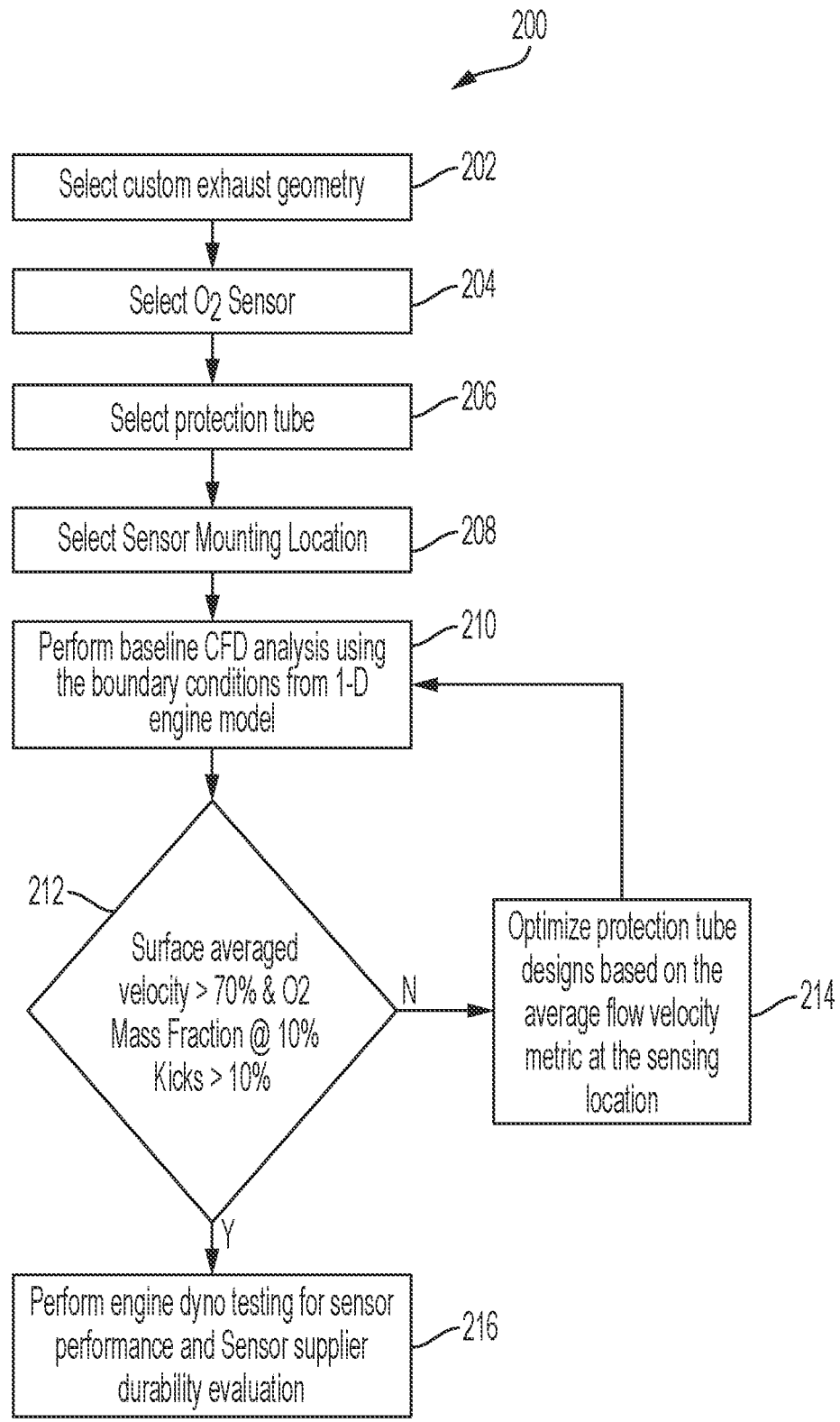
FIG. 4 is an example method of manufacturing the exhaust system of FIG. 1, in accordance with the principles of the present disclosure.

FIG. 4 illustrates an example method 200 of manufacturing the exhaust gas sensor assembly 22 to achieve the improved signal dynamic response described herein by meeting the required SF velocity metrics. The method begins at step 202 by determining the geometry of the exhaust pipe 14 in which the gas sensor assembly 22 will be placed. At step 204, a gas sensor assembly 22 design is provided. This may vary for the type of gas constituent to be to be monitored and manufacturing source of said sensor. At step 206, a protection tube assembly 34 design is provided with the plurality of inlet/outlet apertures 70 believed to meet the required predetermined SF velocity at the sensing element 32.

At step 208, the location of the gas sensor assembly 22 within the exhaust pipe 14 is determined. For example, the chosen location may be downstream of the catalytic converter 20 and determined based on uniformity at the catalyst brick and packaging constraints. At step 210, with the protection tube assembly 34 present, a baseline CFD analysis is conducted, for example utilizing the engine boundary conditions from a 1-D engine model, to determine exhaust flow velocity in the exhaust pipe 14 and the SF velocity at the sensing element 32. Step 212 includes determining if the CFD analysis meets the flow metrics required for the system. For example, it is determined if the SF velocity for the given protection tube design is greater than or equal to 70% of the exhaust gas flow in the exhaust pipe 14. If no, at step 214 the design of the protection tube assembly 34 is varied by adding/removing one or more apertures 70, moving the location of one or more apertures 70, altering the shape of one or more apertures 70, and/or altering the size of one or more apertures 70. The method then returns to step 212 for further CFD analysis. If the CFD analysis meets the flow metrics required for the system, the method proceeds to step 216 where the design is selected and the method ends.

Described herein are systems and methods for manufacturing an exhaust gas sensor with a protection tube with inlet/outlet apertures that have a combined total flow area that allows increased flow and diffusion into the sensor element equal or close to (e.g., ≥70%) that of a maximum flow velocity of the exhaust stream. This allows the gas sensor to achieve a higher dynamic response than known sensors, thereby improving monitoring performance efficiency of upstream components (e.g., catalysts) to maintain efficient emissions control. Unlike known gas sensors, which must be moved to a max flow region to achieve improved dynamic response, the present design allows the gas sensor to operate in customary locations close to the exhaust pipe, thereby enabling high dynamic response, for example, when packaging is limited and a sensor cannot be placed in the max flow region. As such, the protection tube design described herein drastically improves sensor dynamic response without changing its location, thereby minimizing or eliminating packaging concerns.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. An exhaust system for a vehicle having an internal combustion engine, the exhaust system comprising:
    an exhaust pipe configured to receive an exhaust gas flow from the engine at a predetermined first velocity; and
    an exhaust gas sensor assembly coupled to the exhaust pipe and in fluid communication with an interior of the exhaust pipe to sense a predetermined constituent contained within the exhaust gas flow,
    wherein the exhaust gas sensor assembly includes a sensing element disposed at least partially within a protection tube assembly having a plurality of apertures configured to receive a sensor flow (SF) portion of the exhaust gas flow,
    wherein the plurality of apertures has a combined total flow area that provides a surface averaged total velocity at the sensing element to be greater than or equal to 70% of the first velocity to thereby increase a dynamic response of the exhaust gas sensor assembly,
    wherein the protection tube assembly comprises:
        an inner protection tube having a first sidewall with a first set of apertures of the plurality of apertures, the inner protection tube at least partially receiving the sensing element therein, wherein the first set of apertures comprises (i) a first ring of annularly aligned apertures and (ii) a second ring of annularly aligned apertures; and
        an outer protection tube having a second sidewall with a second set of apertures of the plurality of apertures, the outer protection tube at least partially receiving the inner protection tube,
        wherein the first and second sidewalls are arranged concentrically.

2. The exhaust system of claim 1, wherein the exhaust pipe includes a central axis with a central region having a maximum flow velocity at the first velocity.

3. The exhaust system of claim 2, wherein the sensing element is disposed outside of the central region.

4. The exhaust system of claim 3, wherein the exhaust gas sensor is disposed adjacent an inner wall surface of the exhaust pipe.

5. The exhaust system of claim 1, wherein the plurality of apertures has a combined total flow area that provides a surface averaged total velocity at the sensing element to be greater than or equal to 80% of the first velocity to thereby increase a dynamic response of the exhaust gas sensor assembly.

6. The exhaust system of claim 1, wherein the plurality of apertures has a combined total flow area that provides a surface averaged total velocity at the sensing element to be greater than or equal to 90% of the first velocity to thereby increase a dynamic response of the exhaust gas sensor assembly.

7. The exhaust system of claim 1, wherein the plurality of apertures has a combined total flow area that provides a surface averaged total velocity at the sensing element to be substantially equal to the first velocity to thereby increase a dynamic response of the exhaust gas sensor assembly.

8. The exhaust system of claim 1, wherein the second set of apertures comprises:
    a third ring of annularly aligned apertures; and
    a fourth ring of annularly aligned apertures.

9. The exhaust system of claim 8, wherein the first set of apertures further comprises a fifth ring of annularly aligned apertures formed in a small diameter portion of the first sidewall.

10. The exhaust system of claim 1, wherein the exhaust gas sensor assembly further includes a main housing coupled to the protection tube assembly, a plug for sealing the sensing element within the main housing, and electrical leads configured to couple to electrical terminals of the sensing element.

11. The exhaust system of claim 10, wherein the main housing is threadably coupled to the exhaust pipe such that the protection tube assembly and at least a portion of the sensing element are disposed within the exhaust pipe.

12. The exhaust system of claim 1, further comprising a catalytic converter disposed upstream of the exhaust gas sensor assembly.

13. The exhaust system of claim 1, wherein the exhaust gas sensor assembly is an oxygen sensor.

14. The exhaust system of claim 1, wherein the exhaust gas sensor assembly includes and extends along a longitudinal axis, and
    wherein the first and second sidewalls extend parallel to the longitudinal axis.

15. A method of manufacturing an exhaust system for a vehicle having an internal combustion engine, the method comprising:

provide an exhaust pipe configured to receive an exhaust gas flow from the engine at a predetermined first velocity;

coupling an exhaust gas sensor assembly to the exhaust pipe to be in fluid communication with an interior of the exhaust pipe to sense a predetermined constituent contained within the exhaust gas flow;

providing the exhaust gas sensor assembly with a sensing element disposed at least partially within a protection tube assembly having a plurality of apertures configured to receive a sensor flow (SF) portion of the exhaust gas flow; and providing the plurality of apertures with a combined total flow area that provides a surface averaged total velocity at the sensing element to be greater than or equal to 70% of the first velocity to thereby increase a dynamic response of the exhaust gas sensor assembly, wherein the protection tube assembly comprises:

an inner protection tube having a first sidewall with a first set of apertures of the plurality of apertures, the inner protection tube at least partially receiving the sensing element therein, wherein the first set of apertures comprises (i) a first ring of annularly aligned apertures and (ii) a second ring of annularly aligned apertures; and an outer protection tube having a second sidewall with a second set of apertures of the plurality of apertures, the outer protection tube at least partially receiving the inner protection tube, wherein the first and second sidewalls are arranged concentrically.

16. The method of claim 15, further comprising disposing the exhaust gas sensor assembly adjacent an inner wall surface of the exhaust pipe.

17. The method of claim 16, further comprising disposing the exhaust gas sensor assembly outside a central region of the exhaust pipe having a maximum flow velocity at the first velocity.

18. The method of claim 16, further comprising providing a catalytic converter upstream of the exhaust gas sensor assembly, wherein the exhaust gas sensor assembly is an oxygen sensor.

19. The method of claim 15, wherein the exhaust gas sensor assembly includes and extends along a longitudinal axis, and wherein the first and second sidewalls extend parallel to the longitudinal axis.

* * * * *